United States Patent [19]

Schneider

[11] 4,072,803
[45] Feb. 7, 1978

[54] LITHIUM HALIDE CELL

[75] Inventor: Alan Arthur Schneider, Baltimore, Md.

[73] Assignee: Catalyst Research Corporation, Baltimore, Md.

[21] Appl. No.: 716,339

[22] Filed: Aug. 20, 1976

[51] Int. Cl.² .............................................. H01M 2/26
[52] U.S. Cl. .................................... 429/181; 429/191; 429/218; 429/211; 29/623.2
[58] Field of Search ............... 429/181, 191, 218, 239, 429/211

[56] References Cited

U.S. PATENT DOCUMENTS

| 3,660,163 | 5/1972 | Moser | 429/191 |
| 3,723,183 | 3/1973 | Greatbatch | 429/191 |
| 3,874,929 | 4/1975 | Greatbatch | 429/218 |
| 3,944,433 | 3/1976 | Mead et al. | 429/218 |

Primary Examiner—Donald L. Walton
Attorney, Agent, or Firm—Reed, Smith, Shaw & McClay

[57] ABSTRACT

The invention comprises a lithium-halide battery in which the cathode and anode leads are embedded within the lithium anode encasing member and said method comprise folding a lithium sheet to form a lithium vessel as the anode encasing member so as to embed the cathode lead throughout a substantial portion thereof and for making batteries of various sizes using the same mold.

8 Claims, 20 Drawing Figures

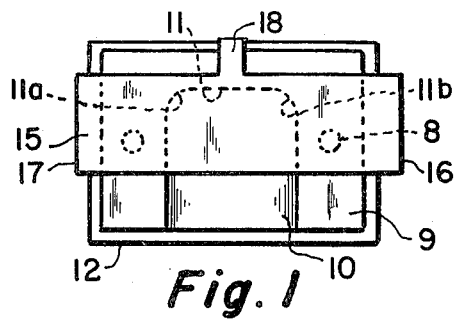
Fig. 1
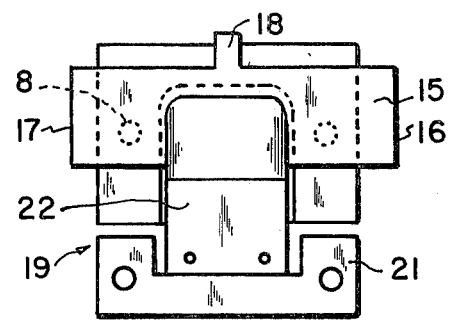
Fig. 2
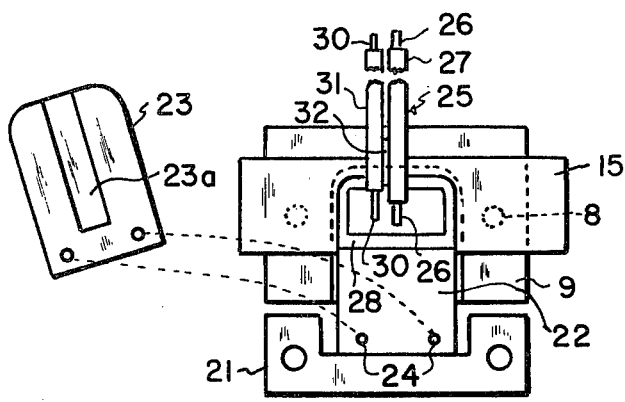
Fig. 3
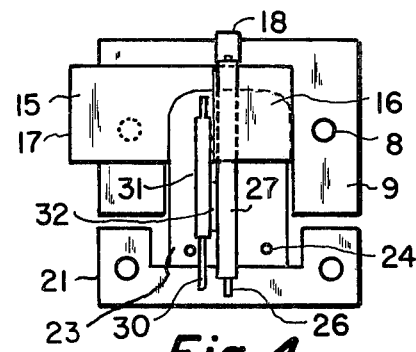
Fig. 4
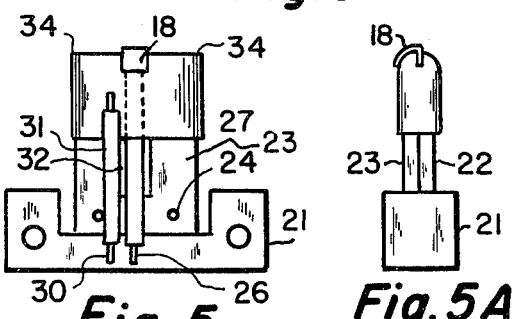
Fig. 5
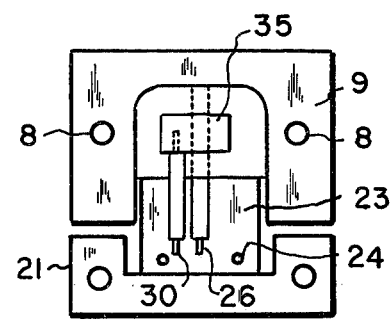
Fig. 5A    Fig. 6
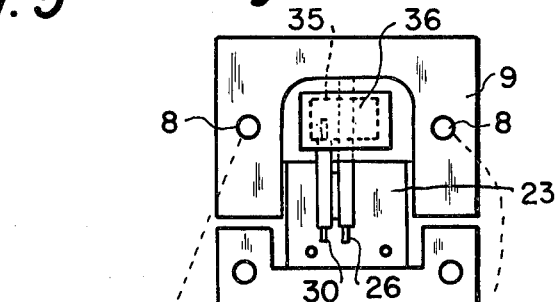
Fig. 7
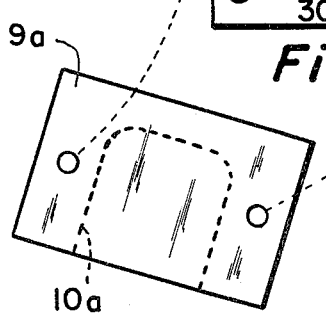

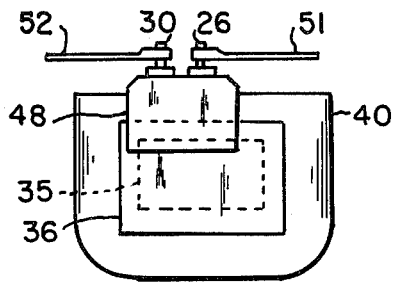
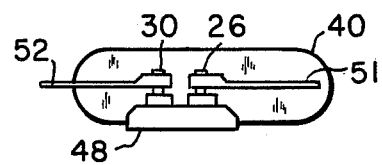
Fig. 14  Fig. 15
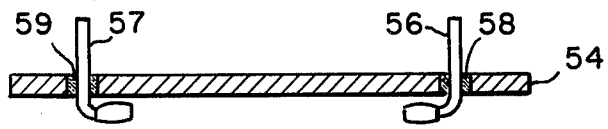
Fig. 16
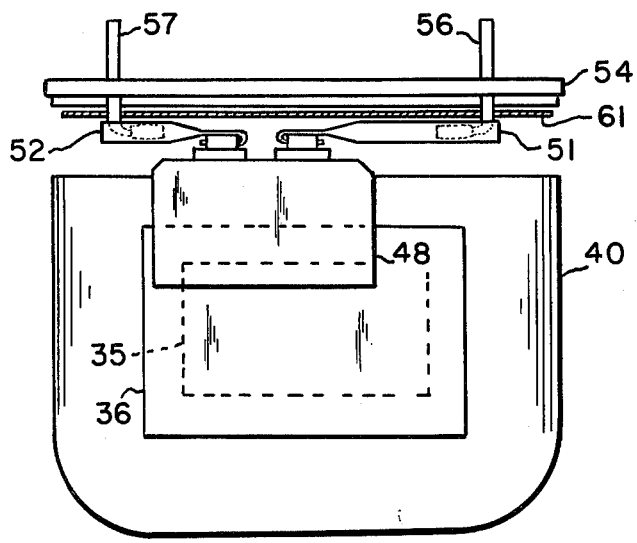
Fig. 17
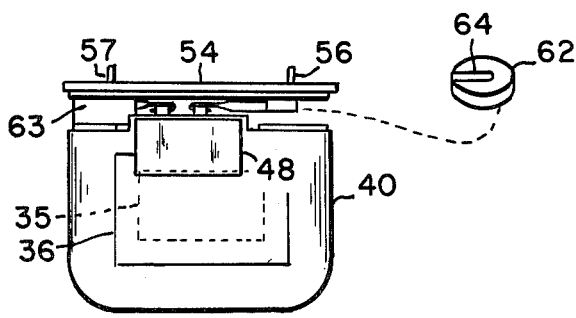
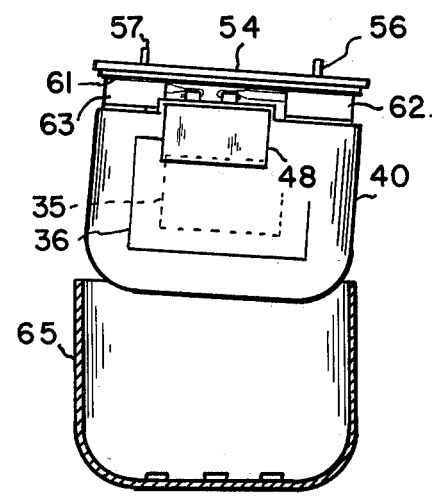
Fig. 18  Fig. 19

LITHIUM HALIDE CELL

FIELD OF THE INVENTION

The present invention relates to an improved lithium halide battery and an improved method for the manufacture of lithium-halide batteries.

BACKGROUND OF THE INVENTION

Primary cells having charge transfer complexes, such as iodine-containing material are generally well known. High energy density batteries utilizing a lithium anode and cathode or organic material such as polycyclic aromatic compounds, organic polymers, heterocyclic nitrogen containing compounds and the like and a halide such as iodine have been disclosed. U.S. Pat. No. 3,660,163. Additionally, cathode compositions comprising a mixture of iodine and poly-2-vinylpyridine. $nI_2$ or poly-2- vinylquinoline. $nI_2$, wherein $n = 2-15$ have been taught; U.S. Pat. No. 3,674,562, incorporated herein by reference. Cathode material of this latter type is typically a pliable, plastic-like solid having a flowable viscosity.

Lithium halide batteries of the present invention are typically used with implantable prosthetics such as cardiac pacemakers. For such application, it is necessary that the battery be physically small and highly reliable. In attaining high reliability, both the design of and the methods for manufacturing the battery are of great importance.

Of the many problems that can arise from poor design or manufacturing processes of lithium halide cells, obtaining satisfactory sealing of the depolarizer within the container is one of the most critical. In many processes, it is difficult, if not impossible, to determine whether a battery will leak until it has been completely assembled with its heremetic seal and tested. Failure to achieve a leak-proof seal requires discarding the battery with little or no salvage. Moreover, it is often times difficult to determine whether a leak-proof seal has been achieved until the battery has been placed in service.

To overcome this and many of the problems that often arise in the manufacture of lithium-halide batteries, a method is disclosed, U.S. patent application Ser. No. 666,161, filed Mar. 12, 1975, now U.S. Pat. No. 4,010,043, in which the cell comprises a lithium receiving vessel which functions as the anode of the battery and as the container of the cathode material. The cathode material is poured into the vessel and a cathode current collector is positioned within the cathode material and the lead is positioned so as to be at least partially embedded within the lithium. The vessel is thereafter cooled to a temperature sufficient to solidify the cathode material. Sealing of the vessel is achieved by positioning a lithium cap on the solidified material and cold welding or diffusion bonding the cap under pressure to the receiving vessel to form a lithium anode encassing member.

The present invention is an important improvement on the method taught and disclosed therein.

It is an object of the present invention to provide a lithium anode cell having one defined end and a flat lithium seal on the other to permit the fabrication of cells of varying lengths from one set of vessel forming molds. It is a further object of the present invention to provide a cell and a method wherein the cathode lead is embedded within the lithium encasing vessel to maximize any possible path for depolarizer leakage. It is also an object of the present invention to provide a method and means wherein the cathode current collector assembly is positioned within the lithium receiving vessel so as to be electrically isolated from the lithium encasement vessel.

SUMMARY OF THE INVENTION

Pursuant to the present invention, lithium-halide primary cells can be made having a variety of lengths utilizing a single mold. In a preferred method, the cathode and anode leads, respectively, are embedded within the side walls of a lithium anode receiving vessel to minimize any possibility of depolarizer leakage. Generally, a method of the present invention comprises utilizing a mold in which only one end of the battery configuration is defined. Preferably, the defined end includes rounded corners as well as a rounded end portion. Actual assembly of the battery must be carried out in a dry room having a relative humidity of preferably less than 2%.

A substantially rectangular sheet of lithium material is positioned over the half-mold so as to extend beyond the edges of the mold cavity with preferably a parting sheet interposed therebetween. A cavity conforming half-member having a configuration substantially identical to the half-mold cavity is positioned over the lithium sheet and pressed into the mold cavity to conform the lithium sheet thereto. While in the cavity, a cathode assembly having a portion which conforms to the end of the half-mold is positioned on the conforming half-member. A second half-member is positioned over the first half-member. and the cathode assembly. One side of the lithium blank is then folded over the second half-member and the lead from the cathode assembly is bent over this folded side so as to surround the lithium fold. The other side of the lithium blank is then folded to lie over both the cathode lead and the first folded side. The half-members together with the folded lithium are removed from the half-mold cavity, and the defined bottom edge of the lithium is trimmed and bent to confrom to the rounded corners of the half-members to form the rough lithium anode receiving vessel. Thereafter, the half-members together with the formed lithium anode receiving vessel positioned thereon are repositioned within the half-mold cavity so that an anode current collector can be bonded to the exterior. The second half of the mold is attached to the half-mold and half-members are compressed to bond all lithium folds together. The formed lithium receiving vessel is thereafter removed from the mold and x-rayed.

The formed lithium receiving vessel is filled with cathode material which had been heated to a flowable consistency and is solidified, after filling, by cooling the filled vessel. A lithium cap is positioned on top of and in contact with the solidified cathode material. The sides and edges of the lithium receiving vessel are thereafter folded over the cap member, but not over the cathode and anode leads. The folded lithium material is pressed to cold bond the folded material to the lid. The projecting anode and cathode leads are connected to extension leads positioned substantially parallel to and spaced away from the folded lithium top member.

A metal cover having a pair of terminal pins extending therethrough and hermetically sealed therein by means of glass-to-metal seals is positioned substantially parallel to the lithium lid and electrically connected to an associated lead extension. A pair of ceramic spacer members are positioned about each of the terminal extenders to maintain the cover in spaced apart relationship from the top of the lithium receiving member.

The primary battery is completed by positioning the cell thus formed within a stainless steel envelope and hermetically sealing the cover to said envelope, preferably by welding. Preferably, the receiving vessel is provided with a fluoroplastic coating or sheathing. The method generally described permits the fabrication of cells in which the cathode lead is positioned within the lithium receiving vessel wall. Additionally, the method of the present invention permits the manufacture of a primary cells of differing lengths using the same molds. Other advantages of the present invention will become apparent from a perusal of the following detailed description of presently preferred embodiments taken in connection with the accompanying drawings.

BRIEF DESCRIPTION OF THE DRAWINGS

FIGS. 1-7 are illustrative representations of preferred method steps for fabricating a lithium receiving vessel;

FIG. 14 is an elecation of the receiving vessel with lead extensions connected to the cathode and anode leads;

FIG. 15 is a plan view of the receiving vessel shown in FIG. 14 with the lead members bent 90°;

FIG. 16 is a sectional elevation of a cover member showing the terminal pins hermetically sealed therein;

FIG. 17 is an enlarged elevation of the receiving vessel and cover plate with the terminals and anode and cathode leads electrically connected thereto;

FIGS. 18 and 19 are elevations showing the positioning of a spacer member between the cover and receiving vessel and the diagrammatic insertion of the receiving vessel into an outer stainless steel case, respectively.

PRESENTLY PREFERRED EMBODIMENT

Figure 8:
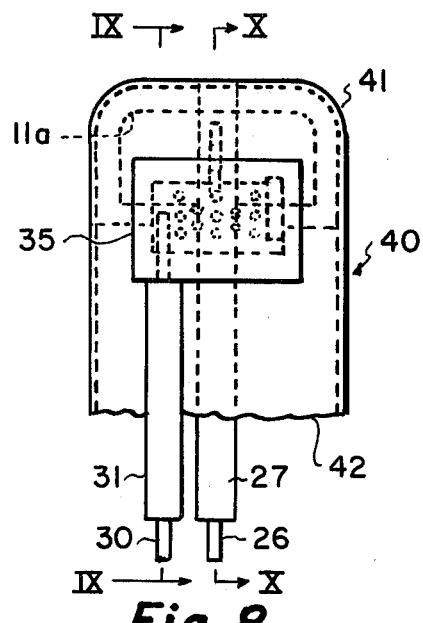
FIG. 8 is an elevation of the completed lithium anode receiving cessel.
Figure 9:
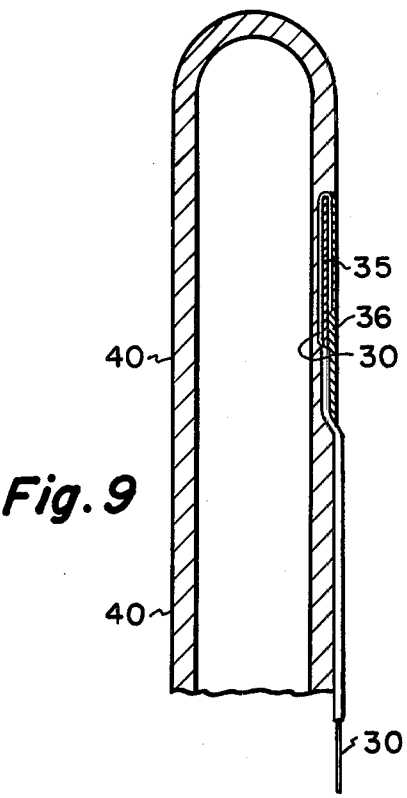
FIGS. 9-10 are sections taken along line IX—IX and X—X of FIG. 8 showing the anode and cathode leads, respectively, embedded within the lithium anode receiving vessel.
Figure 10:
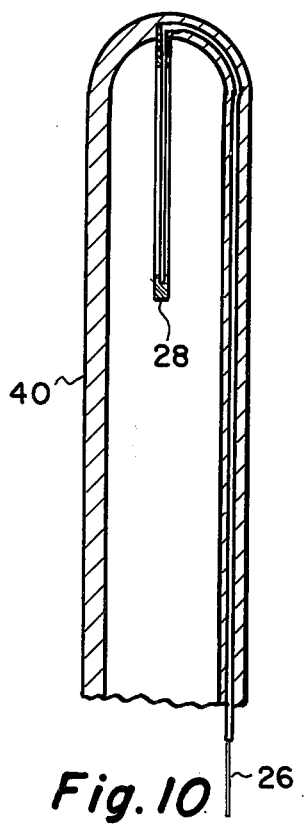

The following description sets forth presently preferred methods of fabricating the lithium-halogen primary cells of the present invention. Referring to FIG. 1, a half-mold 9 with cavity 10 is shown which defines the preferred outer contour of the cells. Cavity 10 includes end portion 11 which defines the fixed end of a lithium anode receiving vessel. Preferably, fixed end 11 is provided with rounded corners 11a and 11b. Also, it is preferred that the sidewall of cavity 10 be rounded.

The fabrication of each cell is begun by positioning over half-mold 9 and cavity 10 a parting sheet 12, for example of clear transparent polyethylene material, to facilitate removal of the lithium from the mold. Over parting sheet 12 is positioned a thin sheet of lithium, preferably from 0.010 to 0.100 inches in thickness, used to form a lithium receiving vessel. Sheet 15 includes first and second sides 16 and 17, respectively, which extend beyond the cavity 10 of mold 9. Each side extends beyond the cavity by an amount at least greater than one-half the width of the cavity. Further, lithium sheet 15 is positioned to extend beyond end 11 of cavity 10 and preferably includes tab extension 18. Sheet 15 may be of any desired length, but as shown it is approximately equal to one-half the length of mold cavity 10. While the length is not critical except as to the desired specifications of the final battery, the length is limited by the length of half-member 22 described below.

With reference to FIG. 2, second mold part 19 is shown with member 21 and half-member 22 which substantially conforms to cavity 10. Half-member 22 is positioned over sheet 15 and pressed into cavity 10 to contour sheet 15 to the perimeter of cavity 10. With half-member 22 positioned within the cavity over the lithium, cathode assembly 25 is arranged so as to lie on half-member 22 with its lead projecting over tab 18.

Referring to FIG. 3, cathode assembly 25 comprises a cathode lead 26 encased in plastic sheathing 27. Cathode lead 26 is preferably made from a thin strip of zirconium or platinum. Preferably, sheathing 27 is a fluoroplastic such as Halar ®. Cathode assembly 25 also includes support positioning frame 28 of substantially open rectangular shape having an end configured to conform to end portion 11 of cavity 10. The perimeter of frame 28 is sized to define substantially the inner cross-sectional perimeter of the lithium vessel. Frame 28 is made from a fluoroplastic, such as Halar ®, and is attached to cathode lead by means of heat welding or cementing.

Because of the shape and size of frame 28, cathode assembly 25, and in particular cathode lead 26, can be accurately and uniformly positioned during manufacture of cells. Preferably, anode lead 30 having a fluoroplastic insulation 31, preferably of Halar ®, is temporarily attached to cathode lead insulation 27 by means of attachment 32 such as tape. While not required, the attachment of anode lead 30 to the cathode lead prior to positioning the cathode lead greatly facilitates fabrication of the cell. After cathode assembly 25 has been positioned on first half-member 22, the second half-member 23 is aligned and positioned over cathode assembly 25 by means of pins 24. Second half-member 23 includes a recess 23a to accommodate the cathode lead.

With reference to FIG. 4, side 16 of lithium sheet 15 is folded over second half-member 23. Cathode lead 26 is then bent over side 16 and positioned in abuttment therewith. If anode 30 is attached to the cathode lead it too is moved so as to be parallel to cathode 26, but anode 30 is not positioned under fold 16. Thereafter, side 17 is folded over cathode lead 26 and side 16. However, if anode 30 is attached to cathode lead 26, side 17 must be positioned under anode 30 by lifting anode 30 out of the way during the folding operation.

Mold 9 is thereafter removed, as shown in FIG. 5, and the top portion of lithium sheet 15, including tab 18, is compressed about the radius of half-members 22 and 23 as more clearly shown in FIG. 5a. Excess material is preferably trimmed from corners 34 and the edges pressed to substantially conform the lithium to the contours of the half-members.

Mold 9 is repositioned as shown in FIG. 6 and a small lithium sheet 35 is cemented to the side of lithium vessel, preferably the same side as that in which the cathode lead 26 is embedded, so as to overlie and contact anode lead 30. Lithium sheet 35 in combination with anode lead 30 comprises the anode current collector for the battery assembly. Preferably, a reinforcing patch of lithium 36 is bonded over patch 35, as shown in FIG. 7, and embeds anode lead 30 within the lithium wall formed by patch 36. Thereafter, the second half 9a of mold 9 having conforming cavity 10a is positioned on mold 9 by means of pins 8. Mold 9 and second part 19 are pressed together, (ca. 700 psi) so as to cold bond all of the seams. The lithium anode receiving vessel with the cathode assembly is then removed and x-rayed to assure that no unwanted openings exist. The pressure asserted by the molds is sufficient to adequately embed both the cathode and anode leads within the lithium. Most importantly, the cathode lead is embedded within at least the length of the vessel to maximize the length of any possible leakage path.

It is important to note that while the use of mold 9 has been shown in process steps illustrated at FIGS. 1-6, it is possible to defer using mold 9 until the final step, FIG. 7, of compressing the lithium receiving vessel. In such cases, the process comprises the utilization of part 19 and in particular, half-members 22 and 23, wherein cathode assembly 25 is positioned between the half-members. After cathode assembly 25 has been positioned between said members as shown in FIG. 3, preferably with anode lead 30 attached to lead 26, the lithium sheet is wrapped around half-members 22 and 23 in the manner similar to that shown in FIG. 4. The steps represented by FIGS. 4-7 and the related description apply to this alternative method. Utilization of mold 9 is thereby deferred until the final step of cold welding the lithium folds.

As shown in FIG. 8, completed vessel 40 includes fixed end 41 having a shape defined by end 11 of cavity 10, and open end 42. The length of vessel 40, from end 41 to end 42, is determined by the length of stock sheet 15 used as well as the length of half-members 22 and 23. As can be seen, however, the length of the vessel formed may be varied greatly within the limits of the half-members, which would include most commercially useful sizes.

Figure 11:
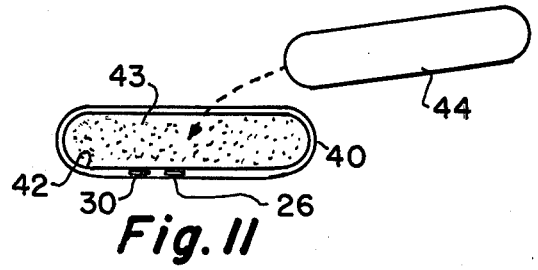
FIGS. 11-13 are illustrative of a method for sealing the cathode-depolarizer material within the receiving vessel.

Referring to FIG. 11, receiving vessel 40 is filled with cathode material 43 through open end 42. Cathode material 43 is a charge-transfer complex of organic material and iodine. Charge-transfer complexes are a well-known class of materials that have two components, one an electron donor, and the other an electron acceptor, that form weakly bonded complexes that exhibit electronic conductivity higher than either component. The charge-transfer complexes are in chemical equilibrium with small amounts of free iodine that is available for electro-chemical reaction. Cathodes containing intimate mixtures of low-conductivity complexes with powdered graphite or inert metal have high conductivities and can provide performance comparable to cells using high-conductivity complexes. Suitable charge complexes may be prepared using an organic donor component such as polycyclic-aromatic compounds, e.g., pyrene, anthracene, and the like; organic polymers, for example, polyehthylene, polypropylene, polyvinyls; or heterocyclic compounds containing nitrogen or sulphur, e.g. phenothiazine, phenazine, and the like. Preferably, the charge transfer complexes comprise a mixture of iodine and solid poly-2-vinyl pyridine $I_2$ or poly-2-vinylquinoline $I_2$.

The electrolyte, preferably lithium iodine, is formed in situ when the anode and cathode surfaces contact and the lithium reacts with iodine in the cathode to form a solid lithium-halide electrolyte layer which is in contact with both the anode and the cathode. Alternatively, the electrolyte can be formed by coating lithium iodide or lithium halide on the lithium anode which coating is formed by reaction of the lithium with iodine or other halogen.

Figure 12:
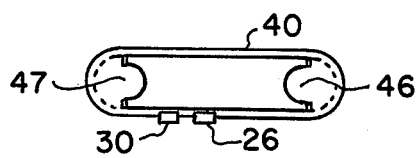
Figure 13:
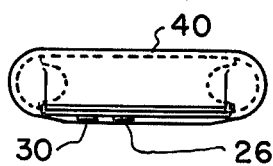

The cathode material is heated to a temperature of between 200° F. and 225° F. to provide a flowable consistency. Receiving vessel 40 is then completely filled with the heated cathode material 43 and the electrolyte is formed in situ. The vessel is chilled, for example to between −130° and −65° F., to solidify cathode material 43. A lid member 44 having a shape substantially the same as opening 42 is positioned on solidified cathode material 43. Ends 46 and 47 are crimped down and over lid 44 as shown in FIG. 12. The side walls are then folded over the crimped end members as shown in FIG. 13. The entire assembly is then positioned in a chilled die similar to mold 9 shown in FIG. 1 and the top pressed while cathode material 43 is in the solidified state. This pressing cold welds lid member 44 and the crimped end and side folds into a unified leak-proof assembly. This assembly is preferably encassed in a film, ca. 0.005 to 0.015 inches, of fluoroplastic such as Halar ® or Teflon ®. This film acts both as an electrical insulator and as an addition seal against cathode or depolarizer leakage.

With reference to FIG. 14, a Halar ® reinforcing member 48 is cemented to vessel 40 and anode and cathode lead 30 and 26, respectively. Lead extensions 51 and 52 are welded to cathode lead 26 and anode led 30, respectively. As can be seen from FIG. 14 lead extensions 51 and 52 are preferably spaced above and parallel to lid 44. Reinforcing member 48 and leads 26 and 30 are then bent at a 90° angle to position the lead extensions substantially in the center of vessel as shown in FIG. 15. A cover plate 54 including terminal pins 56 and 57 is positioned above lid 44. Terminal pins 56 and 57 extend through cover 54 and are securely positioned and sealed therein by means of glass seals 58 and 59, respectively. Cathode and anode leads are bent at a 90° angle and their respective extension leads welded to pins 56 and 57, respectively, as shown in FIG. 17. An insulator plate 61, e.g., 0.003 inch mica, is positioned between the bottom cover 54 and extension 51 and 52. Cylindrical spacer members 62 and 63 are positioned between insulator 61 and lid 44 of vessel 40. As shown in FIG. 18, each spacer member is preferably made from a ceramic material and include a slot 64 which encompasses the respective extension lead and associated terminal pin. Spacers 62 and 63 are cemented to the top of lid 44 and the bottom of insulator member 61 as shown in FIG. 18.

The assembly as shown in FIG. 18 is positioned within outer case member 65, preferably made of stainless steel. The assembly provides a substantially compression fit, but is secured with cement. Once inserted within the case, the outer peripheral edge of case 65 is welded to top cover 54 to provide a hermetic seal for the entire battery assembly.

While presently preferred embodiments of the invention have been shown and described, it may be otherwise embodied within the scope of the appended claims.

What is claimed is:

1. A lithium halide battery comprising a lithium anode receiving vessel; a cathode current collector having a nonconductive positioning frame and a lead attached thereto, said lead having insulation over a substantial portion and being embedded within the lithium of said vessel throughout a substantial part of the insulated portion of said lead; a cathode material positioned in contact with said cathode current collector; and a lithium halide electrolyte coextensively positioned between and in contact with said anode receiving vessel and cathode material.

2. A lithium battery as set forth in claim 1 wherein said cathode material consists essentially of an organic charge transfer complex and a halogen.

3. A lithium battery as set forth in claim 1 wherein the nonconductive frame is configured to the cross-sectional dimensions of the receiving vessel.

4. A lithium halide battery as set forth in claim 1 including an anode current collector having an anode lead positioned on the external side of the anode vessel and said anode lead including an insulating coating thereover.

5. A lithium halide battery as set forth in claim 4 wherein said anode current collector and a portion of its lead is embedded within the lithium of the anode vessel.

6. A lithium halide battery as set forth in claim 4 wherein said anode vessel and current collector are encapsulated in a fluoroplastic film.

7. A lithium halide battery as set forth in claim 4 wherein said anode vessel and current collector are encapsulated within an insulating film, and said encapsulated vessel is positioned within a metal case, said case including an end member having a pair of hermetically sealed terminals, said cathode lead and anode lead being electrically connected to a respective terminal.

8. A lithium halide battery as set forth in claim 7 wherein a ceramic spacer is positioned between said lead member and said vessel at the connection of each of said leads and terminals.

* * * * *